UNITED STATES PATENT OFFICE.

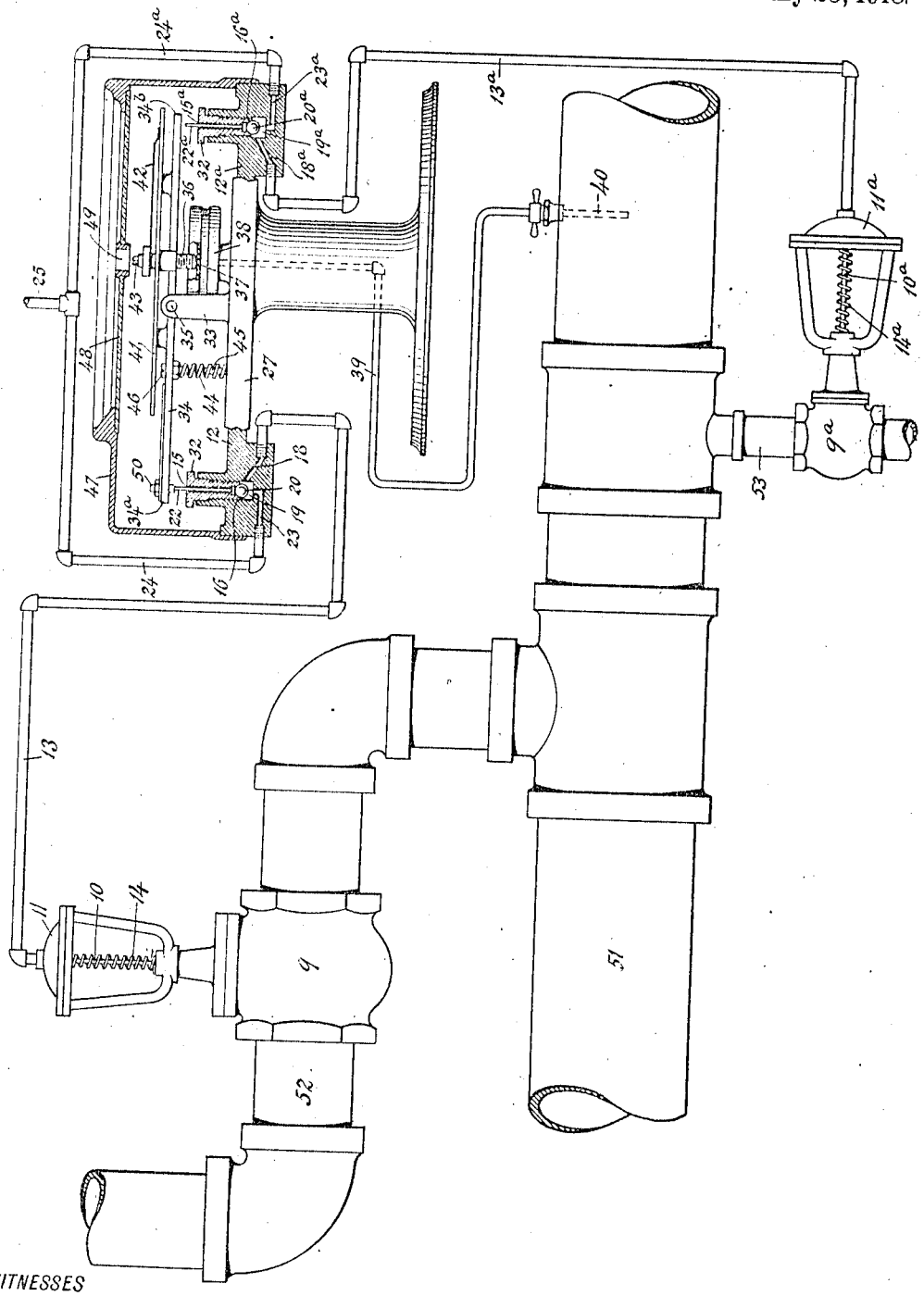

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

TEMPERATURE-CONTROLLING DEVICE.

1,273,407.  Specification of Letters Patent.  Patented July 23, 1918.

Original application filed May 6, 1913, Serial No. 765,737. Divided and this application filed March 23, 1918. Serial No. 224,155.

*To all whom it may concern:*

Be it known that I, ALFRED ROESCH, a citizen of the United States, resident of the borough of Brooklyn, county of Kings, city and State of New York, have invented certain new and useful Improvements in Temperature-Controlling Devices, of which the following is a specification.

My invention relates to temperature controlling devices and more particularly to thermostatic temperature controlling devices and has for its object to control with a single controlling device a plurality of heat producing mediums for heating any given element or place. Heretofore separate controlling devices have been employed for controlling each heating medium and great difficulty has been encountered in adjusting such separate devices to secure a proper coöperation therebetween at the desired temperatures. This difficulty is occasioned by the fact that each controlling device must be connected at different points with the element or place at which the temperature is to be regulated, so that said devices would, in nearly all cases, be subject to or working under different conditions, thus making it almost impossible to secure the desired and accurate coöperation between the different devices. The particular object of my invention is to overcome these serious objections and difficulties by means of a simple and inexpensive construction which is absolutely reliable in action and which may be conveniently used in connection for instance with manufacturing processes, where it is essential to change the controlling points often. A still further object of my improvement is to provide a device of the character indicated which will perform its functions of controlling several heating mediums with any desired number of degrees of temperature intervening between each operation.

My invention will be fully described hereinafter and the features of novelty will be pointed out in the appended claims.

This application is a division of another application filed by me in the United States Patent Office on or about May 6, 1913, Serial No. 765,737.

Reference is to be had to the accompanying drawing which by way of example illustrates an application of my improvement and which represents a diagrammatic view, partly in section of my invention arranged for connection with a calender roll, used for instance in rubber mills or the like.

Referring to the drawing 51 represents a conduit or pipe which is connected at one end for instance with the exhaust of an engine and at its end communicates for instance with the interior of a calender roll of any type for instance such as used in rubber mills, whereby exhaust steam is conducted to the said rolls through the pipe 51 to heat the same. An exhaust pipe 52 is connected with the pipe 51 and communicates with the atmosphere, while another pipe 53 connects the pipe 51 with a boiler or other source of live or high pressure steam, the pipe 53 communicating with the pipe 51 at a point beyond the connection with the exhaust pipe 52.

A valve 9 controls the exhaust pipe 52 and has its stem 10 connected with a diaphragm located in a diaphragm chamber 11, the said chamber being connected with a valve block 12 through the medium of a tube 13. A spring 14 preferably surrounds the stem 10 and serves to return the valve 9 to and maintain it in its open position under certain conditions of the apparatus as will appear more clearly hereinafter. A similar valve 9ª controls the pipe 53 and also has its stem 10ª connected with a diaphragm in the diaphragm chamber 11ª which latter is also connected by means of tube 13ª with a valve block 12ª, a spring 14ª being also provided for returning and maintaining the valve 9ª to and in its open position at certain times. The two valve blocks 12 and 12ª are carried by a support 27, and each valve is provided with a valve chamber 19 and 19ª respectively, which chambers communicate with the tubes 13 and 13ª by means of channels 18 and 18ª respectively. Channels 23 and 23ª lead from said valve chambers 19 and 19ª to tubes 24 and 24ª which in turn are connected in any suitable manner as for instance by means of the pipe 25 with a source of compressed air or other gas. Each valve block 12 and 12ª is further provided with a screw-threaded plug 32 having an axial passage 15 and 15ª extending therethrough, said channels communicating at their outer ends with the atmosphere and at their inner ends with the valve chambers 19 and 19ª, valve seats 16 and 16ª being located at the inner end of each passage 15 and 15ª. Valves 20 and 20ª are located in the chambers 19 and 19ª and are connected with rods 22 and 22ª extending through and beyond the passages 15 and 15ª respectively, the said rods being smaller in diameter than the said passages so as not to completely obstruct the same. The support 27 is provided with preferably integral and upright lugs 33 on which a lever 34 is pivoted at 35, said lever extending in opposite directions from said pivot with its opposite ends 34ª and 34ᵇ over the free ends of the rods 22 and 22ª respectively. This lever 34 at an intermediate point carries a preferably screw-threaded adjustable projection 36 the one end of which engages a diaphragm 37 located in or closing a diaphragm chamber 38 which latter is connected by means of a tube 39 with a bulb 40 suitably secured in position so as to extend into the interior of the pipe 51, the said bulb 40 being partially or entirely filled with a suitable liquid or gaseous fluid which is susceptible to changes in temperature, the said bulb comprising what might be termed a sensitive member. The lever 34 further carries a scale plate 41 suitably graduated to indicate degrees of temperature and which coöperates with a pointer 42 secured to the projection 36 whereby the apparatus may be set to operate at predetermined temperatures, the projection 36 being preferably provided with an angular head 43 for accommodating a suitable key or other instrument by means of which the adjustment of the said projection and consequently the device may be facilitated. A spring 44 has its one end in engagement with the support 27 and preferably surrounds a pin 45 thereon and has its other end abutting against a screw 46 located on the lever 34, the said spring 44 serving to maintain the end of the projection always in contact with the diaphragm 37. By manipulating the screw 46 the tension of the spring 44 may be properly adjusted. If desired a cover 47 having a transparent portion 48 may be secured upon the support 27 so as to protect the otherwise exposed parts of the thermostatic controller, a suitable opening 49 being in this case provided in the transparent portion 48 for permitting access to the angular head 43 of the projection 36. In order that the number of degrees of temperature between the successive control of the heating mediums may be varied, I prefer to provide the lever 34 with an adjustable screw 50 adapted to be moved toward and away from the stem 22 as shown in the drawings. By adjusting this screw 50 the opposite end of the lever 34 is brought nearer to or farther away from the stem 22ª, and the degrees between the operation of the valves 20 and 20ª thus increased or diminished.

With the parts in the condition illustrated the compressed air or other gas entering the chambers 19 and 19ª will maintain the valves 20 and 20ª against the seats 16 and 16ª so that said compressed air or other gas passes from the tubes 24 and 24ª through channels 23 and 23ª into the chambers 19 and 19ª, and thence through the channels 18 and 18ª and tubes 13 and 13ª to the diaphragm chambers 11 and 11ª. The diaphragms in said chambers 11 and 11ª will thus be under pressure and will in consequence maintain the valves 9 and 9ª in closed condition against the tension of the springs 14 and 14ª so that the exhaust pipe 52 is closed and no live or high pressure steam can reach the pipe 51. Under these circumstances exhaust steam will pass through the pipe 51 to the calender roll and in its passage will contact with the bulb or sensitive member 40 which extends into the pipe 51 and thus into the path of the exhaust steam. The position of said bulb 40 further is such that it will also be in the path of the live or high pressure steam when the valve 9ª is open as will be hereinafter more fully brought out.

If the temperature begins to fall the diaphragm 37 will move downwardly and thus permit the projection 36 to drop, which will cause the lever 34 to swing on its pivot 35, partly by gravity and partly under the influence of the spring 44. As the temperature continues to fall the end 34ᵇ of the said lever will finally engage and depress the rod 22ª and in consequence will move the valve 20ª away from the seat 16ª and over the end of the channel 23ª to close the latter. By this means the tube 13ª will be cut off from the source of compressed air or other gas and will be thrown into communication with the atmosphere, thus relieving the diaphragm in the chamber 11ª from pressure and permitting the spring 14ª to open the valve 9ª and live or high pressure steam to enter the pipe 51 through the pipe 53. As the temperature begins to rise again the lever 34 will be swung on its pivot 35 in the reverse direction, whereby the end 34ᵇ will be moved away from the rod 22ª and the valve 20ª will be returned to its seat 16ª by the pressure of the air or other gas in the chamber 19ª. The tube 13ª will thus again be cut off from the atmosphere and again connected with the source of compressed air or other gas which will again depress the diaphragm in the chamber 11ª and thus again close the valve 9ª against the tension of the spring 14ª and shut off the flow of live steam to the pipe 51. Should the temperature continue to rise from any cause even after the high pressure steam has been cut off then the diaphragm 37 will continue to swing the lever 34 and will cause its end 34ª to depress the rod 22 and thus move the valve 20 away from the seat 16, and over the end of the channel 23 to close the latter. In this manner the tube 13 is disconnected from the source of compressed air or gas and is thrown into communication with the atmosphere, so that pressure on the diaphragm in the chamber 11 is removed and the valve 9 is opened through the medium of the spring 14. The pipe 51 is thus opened to the atmosphere through the exhaust pipe 52 so that a portion at least of the exhaust steam passes out through the exhaust pipe 52 and consequently does not reach the roll. In consequence the temperature at the bulb 40 will begin to drop and the lever 34 will return to the position shown in the drawing and the valve 20 will be moved back to the seat 16 by the pressure of the air or gas in the chamber 19. The compressed air or other gas now again passes through the tube 13 and depresses the diaphragm in the chamber 11 and again closes the valve 9 and thus disconnects the pipe 51 from communication with the atmosphere. Under these conditions the parts will again be in the position shown and all of the exhaust steam will pass through the pipe 51 and to the calender roll.

Should the temperature rise when the parts are as shown in the drawing, the lever 34 will be rocked and its end 34ª caused to immediately depress the rod 22 to operate the various parts and cause the valve 9 to be opened as last described above.

It will be seen that with my invention I overcome by means of a very simple efficient and inexpensive device all of the difficulties heretofore experienced in the art to which this application pertains. In the first place, having but one thermostatic member, its various functions will always be performed successively and in unison at the temperatures at which they are intended to be performed. In the second place, the controller can be adjusted to perform the various functions with any number of degrees intervening between them and the relation between the various functions will always remain the same at any temperature settings.

The invention may be used in many ways as for instance as shown in the drawing, in which said invention is used in connection with a calender roll, used for instance in rubber mills. It is to be understood that this is only an example of the use to which my improvement may be put and that the same may be utilized in many other ways.

In large dry rooms it is essential to have a large heating surface in order to bring the temperature of the room up to the desired temperature quickly, and when this temperature has been reached, to make it necessary to use only a small portion of the heating surface to maintain the temperature at a substantially fixed point. It is impossible to get any satisfactory control with a single-function controller, for the reason, that, although the controller shuts off the steam at the temperature for which it is set, the heat radiating from so large a surface will raise the temperature many degrees above the desired temperature. This also causes an unnecessary waste of steam.

With my two-function controllers I get perfect control and eliminate the waste of steam, by dividing the heating coils into two properly proportioned sections and using all the coils to bring the dry room up to within a few degrees of the desired temperature, then shutting off the large section of the heating coil and using the smaller section to keep up the desired temperature. It is to be understood that the mechanism which controls the valves for turning on or shutting off the heating mediums may be of any type as long as the same is controlled by a single sensitive member and controls all of the valves.

Various changes in the specific form shown and described may be made within the scope of the claims without departing from the spirit of my invention.

I claim:

1. In a device of the character described, the combination of a main pipe connected with a source of heat supply, an exhaust pipe connected with said main pipe, an auxiliary pipe connected with said main pipe and with a second source of heat supply, a valve in said exhaust pipe, a valve in said auxiliary pipe, additional valves connected with each of said pipe valves, a single lever adapted to actuate each of said additional valves whereby said pipe valves are operated and a sensitive member adapted to be affected by the temperature in said main pipe and to actuate said lever.

2. In a device of the character described, the combination of an element connected with a plurality of sources of different heating mediums, means for controlling the escape of one medium from said element, means for controlling the entry of another medium to said element, a sensitive member, and actuating mechanism common to both controlling means itself controlled by said sensitive member.

3. In a device of the character described, the combination of a main pipe connected with a plurality of sources of different heating mediums, a fluid operated valve for controlling the escape of one medium from said pipe, a second fluid operated valve for controlling the entry of another medium to said pipe, said valves operating independently of each other, a sensitive member and an actuating device common to both of said valves and itself controlled by said sensitive member.

In testimony whereof I have hereunto set my hand.

ALFRED ROESCH.